(12) United States Patent
Pagan (10) Patent No.: US 6,739,634 B1
(45) Date of Patent: May 25, 2004

(54) GEL-AIR IMPACT BUMPER AND RETRACTABLE IMPACT SPOILER WITH ATTACHED IMPACT HOOD SHIELD

(76) Inventor: Celt-Taras Pagan, 30101 Rolling Oak Dr., Bear Valley Springs, CA (US) 93561

( * ) Notice: Subject to any disclaimer, the term of this patent is extended or adjusted under 35 U.S.C. 154(b) by 0 days.

(21) Appl. No.: 10/211,775

(22) Filed: Aug. 1, 2002

(51) Int. Cl.7 ............................................. B60R 19/00
(52) U.S. Cl. ..................... 293/117; 293/142; 296/180.1; 296/136.08
(58) Field of Search ...................... 296/180.1, 136.02, 296/136.08; 293/117, 142; 150/166

(56) References Cited

U.S. PATENT DOCUMENTS

| | | | |
|---|---|---|---|
| 3,574,379 A | * | 4/1971 | Jordan ......................... 293/109 |
| 3,897,095 A | * | 7/1975 | Glance et al. |
| 4,176,858 A | * | 12/1979 | Kornhauser |
| 4,274,667 A | | 6/1981 | Dietmar |
| 4,324,427 A | | 4/1982 | Huang et al. |
| 4,643,471 A | | 2/1987 | Fishback |
| 4,823,923 A | * | 4/1989 | Moyer ......................... 188/376 |
| 4,842,319 A | | 6/1989 | Ziegler et al. |
| 4,877,266 A | * | 10/1989 | Lamparter et al. |
| 4,951,994 A | * | 8/1990 | Miwa |
| 4,953,909 A | | 9/1990 | Crane |
| 4,997,229 A | | 3/1991 | Swanson |
| 5,056,817 A | | 10/1991 | Fuller |
| 5,158,324 A | | 10/1992 | Flesher |
| 5,800,006 A | * | 9/1998 | Pettigrew |
| 5,975,621 A | | 11/1999 | Lefevre |
| 6,152,487 A | * | 11/2000 | Crick |
| 6,176,529 B1 | * | 1/2001 | Kitzmiller et al. |
| 6,247,742 B1 | * | 6/2001 | Boudreaux |
| 6,254,170 B1 | * | 7/2001 | Farmer et al. |
| 6,460,909 B2 | * | 10/2002 | Mansoor et al. |
| 2001/0007395 A1 | * | 7/2001 | Gentile |
| 2003/0034660 A1 | * | 2/2003 | Kelly |
| 2003/0057730 A1 | * | 3/2003 | De Laney |

* cited by examiner

*Primary Examiner*—Stephen Gordon
(74) *Attorney, Agent, or Firm*—Thomas I. Rozsa; Tony D. Chen

(57) ABSTRACT

An external impact protective apparatus for a vehicle, including a hood shield device which is detachably attached to the vehicle's hood, a gel-pac impact bumper device and a flexible spoiler device. The hood shield device covers the hood as well as the fenders of the vehicle. The gel-pac bumper device is detachably connected to the hood shield device and hangs down therefrom to cover a portion of the vehicle's grill to allow for airflow to the engine and protect the vehicle's bumper for heavier impact events and adding impact integrity to the overall apparatus' safety feature. The gel-pac bumper device is engineered to absorb light collisions to begin an impact event with a cushioning protection to absorb an additional 5 mph/hr impact in excess of the impact absorption of conventional bumpers. The flexible spoiler device is hingeably connected to the gel pac bumper device for reducing lift at high speeds and protecting the bottom of the vehicle from objects underneath.

15 Claims, 6 Drawing Sheets

GEL-AIR IMPACT BUMPER AND RETRACTABLE IMPACT SPOILER WITH ATTACHED IMPACT HOOD SHIELD

BACKGROUND OF THE INVENTION

1. Field of the Invention

The present invention relates generally to the field of automotive equipment. More particularly, the present invention relates to the field of exterior protective devices for use with vehicles to protect the hood of vehicles from various road hazzards such as rocks, pebbles and other debris and also provides additional impact safety against impacts caused by the vehicle crashing into something or from collisions and fender end impacts such as curbs, tree branches, shopping carts, parking lot walls, posts, etc.

2. Description of the Prior Art

Specifically, exterior protective devices for vehicle hoods are well known in the art. The most common type which is currently in use is a plastic or vinyl type covering which is stretched over the hood of the vehicle and is retained in place by various attaching means. However, none of prior art vehicle hood protectors have means for providing additional impact protection against impacts caused by the vehicle crashing into something or from collisions and fender end impacts. One of the disadvantages with this type of hood protector is that it is bolted or screwed into a vehicle: both requiring the placement of holes into a vehicle; and requiring an individual to have the skills and tools to do so. Another problem with prior art hood protectors is that in most designs, the protector, whether it is made of cloth or plastic, must be removed when the vehicle's hood is to be raised to access the engine well for purposes of checking the oil, battery, etc. A further disadvantage with prior art hood protectors is that they can be easily stolen.

The following nine (9) prior art patents are found to be pertinent to the field of the present invention:

1. U.S. Pat. No. 4,274,667 issued to Dietmar on Jun. 23, 1981 for "Bumper For Motor Vehicles" (hereafter the "Dietmar Patent");
2. U.S. Pat. No. 4,324,427 issued to Huang et al. on Apr. 13, 1982 for "Automobile Bumper With Adiabatic Device" (hereafter the "Huang Patent");
3. U.S. Pat. No. 4,643,471 issued to Fishback on Feb. 17, 1987 for "Automotive Vehicle Dent Protection Device" (hereafter the "Fishback Patent");
4. U.S. Pat. No. 4,842,319 issued to Ziegler et al. on Jun. 27, 1989 for "Deflector Shield And Guard Assembly For Motor Vehicles" (hereafter the "Ziegler Patent");
5. U.S. Pat. No. 4,953,909 issued to Crane on Sep. 4, 1990 for "Vehicle Hood Protector With Specialized Attaching Apparatus" (hereafter the "Crane Patent");
6. U.S. Pat. No. 4,997,229 issued to Swanson on Mar. 5, 1991 for "Apparatus For Covering Selected Portions Of A Vehicle Body" (hereafter the "Swanson Patent");
7. U.S. Pat. No. 5,056,817 issued to Fuller on Oct. 15, 1991 for "Temperature-Rise Limiting Automobile Bra" (hereafter the "Fuller Patent");
8. U.S. Pat. No. 5,158,324 issued to Flesher on Oct. 27, 1992 for "Protective Cover For Vehicles" (hereafter the "Flesher Patent"); and
9. U.S. Pat. No. 5,975,621 issued to Lefevre on Nov. 2, 1999 for "Vehicle Hood Shield" (hereafter the "Lefevre Patent").

The Dietmar Patent discloses a bumper for motor vehicles. It comprises a rigid support and a covering made of elastic material. The covering has two arms extending from an edge of the covering that is adjacent to the body in use. First arms are located within the contour of the covering and include a fastening section for attaching the covering to the vehicle, and second arms form an extension of the outside contour of the covering and conceal the first arms. A flexible hinge is utilized to connect the covering to the body.

The Huang Patent discloses an automobile bumper with a flexible adiabatic device. It includes a shock-absorbing device for receiving impact blows to the bumper.

The Fishback Patent discloses an automotive vehicle dent protection device. It comprises a pair of shock absorbing elements joined by connectors. The absorbing elements comprise a series of laterally adjacent pockets that are open at the top for allowing easy removal or replacement of shock absorbing inserts.

The Ziegler Patent discloses a deflector shield and guard assembly for motor vehicles. The device comprises a molded wraparound shield assembly attached along the horizontal and vertical side edges of the hood portion directly behind the grille which is secured in placed by flexible shock mounting strips along the horizontal edge and vertical sides of the hood portion. The device further comprises a molded wraparound cover plate positioned in an overlapping relation to the horizontal edge and opposite vertical side edges of the shield. The device further comprises molded guard members disposed in an overlying relation to a surrounding portion of the front grille of the vehicle together with front fender guard members which conform to and are disposed in overlying relation to the front fender and headlight portion of the vehicle.

The Crane Patent discloses a vehicle hood protector with a specialized attaching apparatus. The attaching apparatus includes four attaching blocks identical to retaining blocks, attached at the two front corners of the hood and at the intersection of the hood protector at the rearmost edges of the hood which are covered by the hood protector.

The Swanson Patent discloses an apparatus for covering selected portions of a vehicle body. It comprises an engaging structure which includes straps, webbing or a fabric sleeve and is configured to engage a member for securing and conforming the cover on the selected portion of the vehicle so that the cover maintains conformity with the first contoured area and edges.

The Fuller Patent discloses a temperature-rise limiting automobile bra which is constructed from four layers of materials, which include a first non-abrasive layer, a second thermal radiation reflective layer, a third elastomeric reticulated foam layer, and a fourth water impervious layer.

The Flesher Patent discloses a protective cover for vehicles. The protective cover comprises a plurality of segments which are made of flexible material. Each segment has a particular ferromagnetic sheet magnetic base portion and a resilient top portion. Each segment is cut to conform to the physical characteristics of the external body surface of the vehicle, and is secured by the magnetic attraction of the magnetic base portion to the magnetically attractive body portion of the vehicle.

The Lefevre Patent discloses a vehicle hood shield. It comprises a layer of flexible magnetically impregnated material to which is contiguously bonded a soft emulsion layer. The shield is cut in the general shape of a vehicle hood and including V-shaped cuts along the reward edge to facilitate placement onto a vehicle hood without bunching.

It is desirable to provide a vehicle impact protective apparatus which is aesthetic in appearance and is functional in that it protects the hood from being dented and damaged by flying objects and debris which may be thrown against the hood, and has an attaching mechanism to prevent it from being easily stolen while at the same time permitting access to the engine compartment without the necessity of removing the impact protective apparatus. It is also desirable to provide a vehicle impact protective apparatus which includes a gel-air impact bumper, a retractable impact spoiler and an impact hood shield for providing impact safety against impacts caused by the vehicle crashing into something or from collisions and fender end impacts such as curbs, tree branches, shopping carts, parking lot walls, posts, etc.

SUMMARY OF THE INVENTION

The present invention is an external impact protective apparatus for vehicles. The apparatus includes an impact hood shield device, a gel-air impact bumper device and a flexible retractable impact spoiler device. The hood shield device is detachably attached to the vehicle's hood by retaining locking systems such that the hood shield device covers the hood as well as the front fenders of the vehicle. The gel-air bumper device is detachably connected to the hood shield device and hangs down therefrom to cover a portion of the vehicle's grill to allow for airflow to the engine and protect the vehicle's bumper in case of heavier impact events and adding impact integrity to the overall apparatus' safety feature. The gel-air bumper device will not cover or obstruct the headlights, turn signal lights or any other lights on the vehicle and the gel-air bumper device is designed to absorb light collisions with the cushioning protection to about an impact of an additional 5 mph/hr over the impact a conventional bumper is designed to absorb. The flexible spoiler device is hingeably connected to the gel-air bumper device for reducing lift at high speeds and protecting the bottom of the vehicle from objects underneath.

It has been discovered, according to the present invention, that if an external impact protective apparatus includes an impact hood shield device made of one piece of clear material conformed to the shape of the hood of a vehicle, then the hood shield device can act as a protective barrier to prevent rocks and other debris which are thrown upon the hood from marring the hood, while at the same time functioning as a decorative accessory which does not detract from the appearance of the vehicle.

It has also been discovered, according to the present invention, that if an external impact protective apparatus includes an impact hood shield device that is retained on the hood by a retaining locking system that is held in place through a channel wedge member attached to the edge of the hood and wedged in the groove between the hood and the fender of a vehicle, then the hood shield device is safely secured on the vehicle in a manner by which it cannot be stolen off a locked vehicle even when the vehicle is left unattended.

It has additionally been discovered, according to the present invention, that if an external impact protective apparatus includes a gel-air impact bumper device that is detachably attached to a hood shield device and covers a portion of the vehicle's grill to allow for airflow to the engine while at the same time not covering or obstructing the headlights, turn signal lights or any other lights on the vehicle, then the gel-air bumper device can absorb light collisions caused by impacts such as from other vehicles, curbs, tree branches, shopping carts, parking lot walls, posts, etc.

It has further been discovered, according to the present invention, that if an external impact protective apparatus includes an impactable rubber retractable impact spoiler device that is hingeably connected to a gel-air impact bumper device, then the spoiler device can swivel away without breaking when the spoiler device strikes an object and springs back to its initial position ready for another impact such as a parking curb.

It is an object of the present invention to provide an external impact protective apparatus which includes an impact hood shield device that protects the hood of vehicles from rocks and other debris which may be thrown onto the vehicle's hood. In the alternative embodiment which includes a metal embedded crash grill adaptation—an off road style—it can absorb even greater values than just the metallic grills.

It is also an object of the present invention to provide an external impact protective apparatus which includes an impact hood shield device which is decorative and does not detract from the appearance of the vehicle and also does not hide the surface of the hood from view.

It is an additional object of the present invention to provide an external impact protective apparatus which includes an impact hood shield attached to the hood in a manner which prevents the hood shield device from being removed from a locked vehicle with the hood in the closed position.

It is a further object of the present invention to provide an external impact protective apparatus which permits the user to have access to the engine compartment of the vehicle without first requiring the external impact protective apparatus to be removed.

It is still an additional object of the present invention to provide an external impact protective apparatus which includes a gel-air impact bumper device that is detachably attached to a hood shield device.

It is still a further object of the present invention to provide an external impact protective apparatus which includes a flexible retractable impact spoiler device that is hingeably connected to a gel-air impact bumper device, so that the spoiler device can swivel away without breaking when the spoiler device strikes an object and springs back to its initial position ready for another impact.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
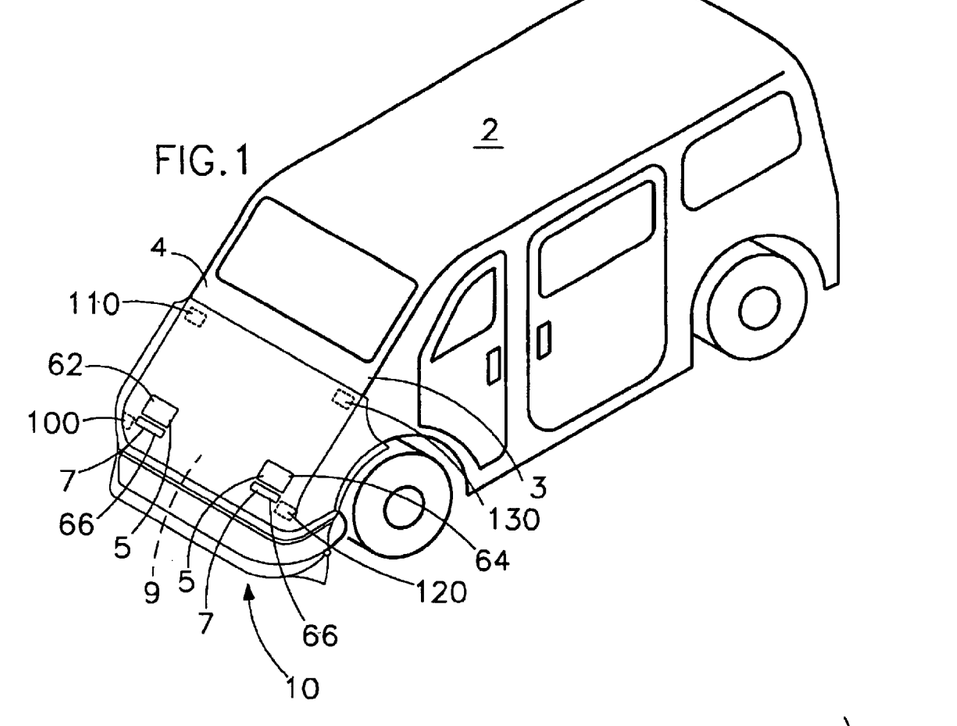
FIG. 1 is a perspective view of the present invention external impact protective apparatus attached to a hood of a vehicle.
Figure 2:
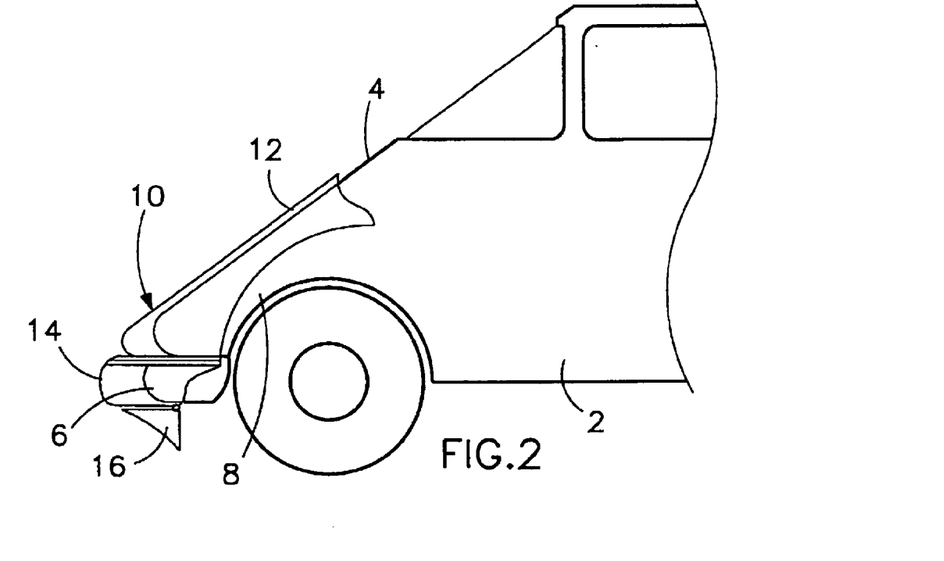
FIG. 2 is a side elevational view of the present invention external impact protective apparatus attached to a hood of a vehicle.
Figure 3:
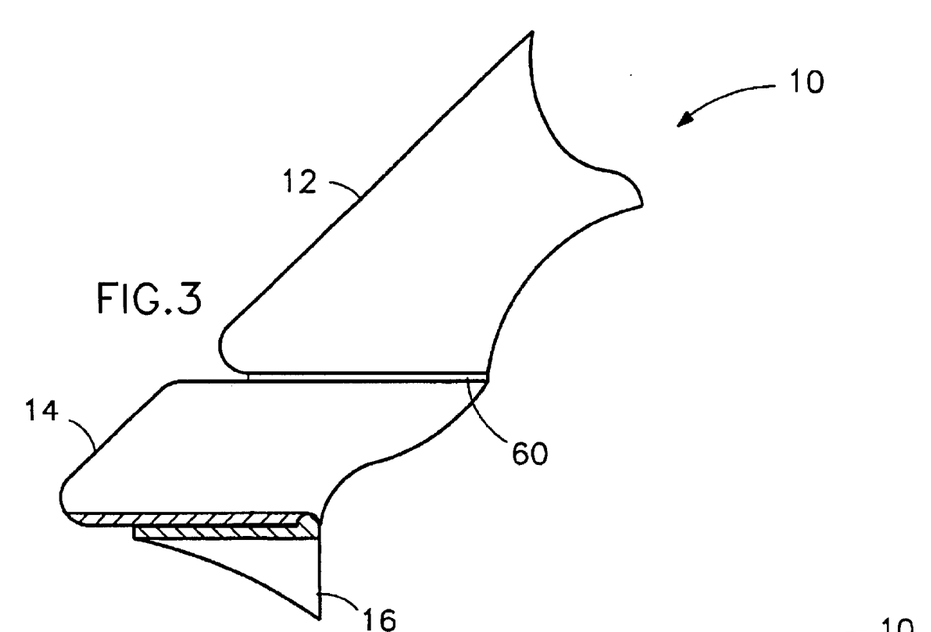
FIG. 3 is a cross-sectional view taken along line 3—3 of FIG. 1.
Figure 4:
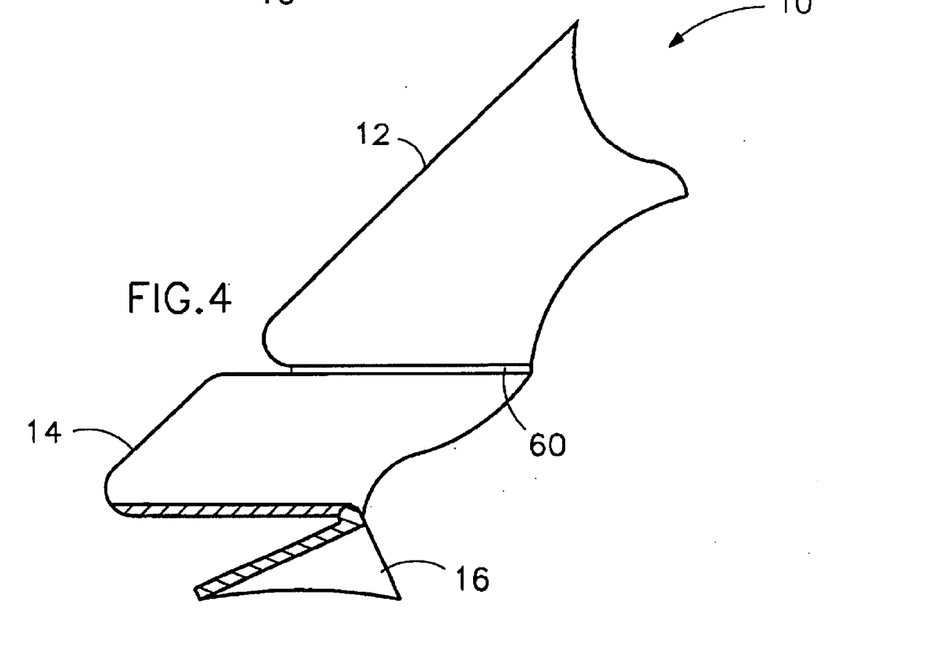
FIG. 4 is a side elevational view of a flexible retractable impact spoiler device in accordance with the present invention, showing the spoiler device jarred from its initial position shown in FIG. 3.

Referring to FIGS. 1 and 2, there is shown at 10 the present invention external impact protective apparatus installed on a vehicle 2 such as a van. It will be appreciated that the van 2 shown is merely one illustrative embodiment and the present invention can be installed on many different kinds of vehicles not shown.

The present invention external impact protective apparatus 10 can be used with any desired vehicle. However, the most frequent use will be with minivans or cab forward vehicles or other suitable vehicles which can utilize the present invention. It is anticipated that the configuration of the external impact protective apparatus 10 will be designed to accommodate the shape of the hood of the specific vehicle for which it will be used. Any plurality of shapes of the external impact protective apparatus 10 are within the spirit and scope of the present invention and any shape to accommodate any style hood can be retained by the mechanism of the present invention.

Referring to FIGS. 1, 2, 3 and 4, the impact protective apparatus 10 includes an impact hood shield device 12, a gel-air impact bumper device 14 and a flexible retractable impact spoiler device 16. The hood shield device 12 is designed to fit smoothly over the hood 4 of the vehicle 2 such that it covers almost the entire hood 4 and front fenders 8. The impact bumper device 14 is designed to cover the existing bumper 6 of the vehicle 2 and adapted to rest along the front bumper 6. The flexible retractable impact spoiler device 16 is designed to be underneath the vehicle 2 and located where the existing spoiler is positioned on the vehicle 2.

The hood shield device 12 is made of clear and strong material such as high impact plastic which is semi transparent or painted the exact same color as the vehicle and engineered plastic materials such as Lexan® so as not to hide the color and stylized design of the hood 4 of the vehicle 2 and to be sufficiently thick and strong so as to provide an effective barrier of protection and for a front end collision, impacts where crash grills help, or other road debris are thrown against the hood 4 or when an impact occurs.

Figures 8, 9, 10:
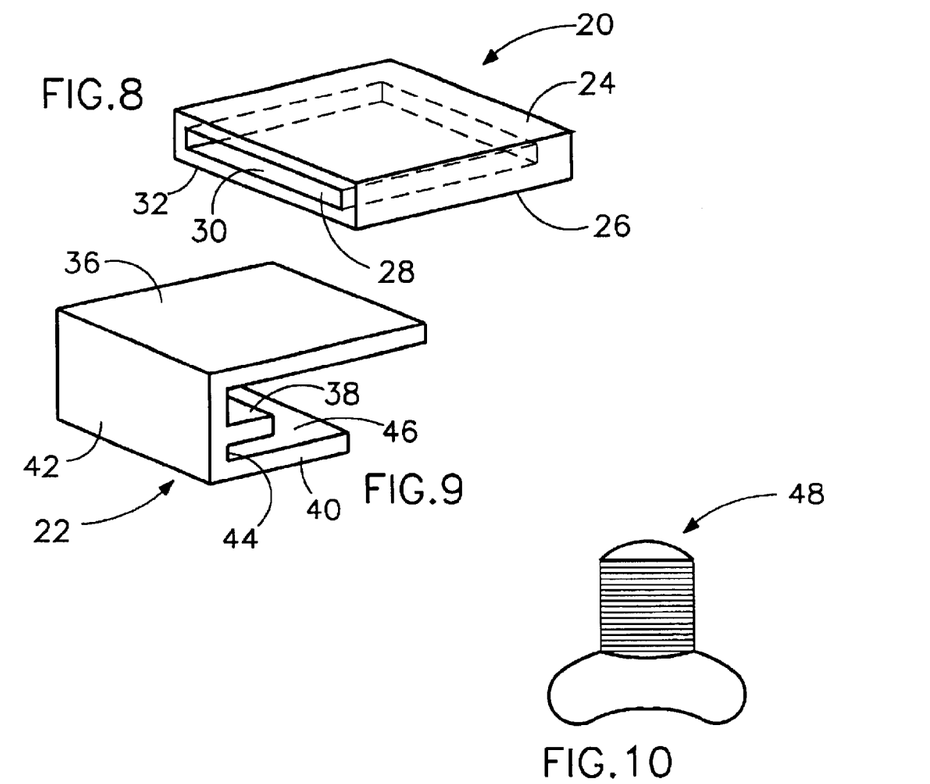
FIG. 8 is an enlarged perspective view of a retaining block of the retaining locking system in accordance with the present invention.
FIG. 9 is an enlarged perspective view of a mating clip attaching means of the retaining locking system in accordance with the present invention.
FIG. 10 is an enlarged perspective view of a securing means of the retaining locking assembly in accordance with the present invention.

In addition to the one-piece design of the hood shield device 12 of the external impact protective apparatus 10, the present invention has means by which the hood shield device 12 is attached and held in place on the hood 4 of vehicle 2. Referring to FIGS. 8, 9 and 10, the present invention is provided with four retaining locking systems, wherein each retaining locking system comprises one retaining block 20, one mating clip attaching means 22 and one or more soft tip threaded wing bolts 48. Two of the retaining locking systems are attached at the two front corners of the hood 4 and at the intersection of the hood shield device 12 and the rearmost edges of the hood 4 which are covered by the hood shield device 12, as illustrated in FIG. 1.

Figure 7:
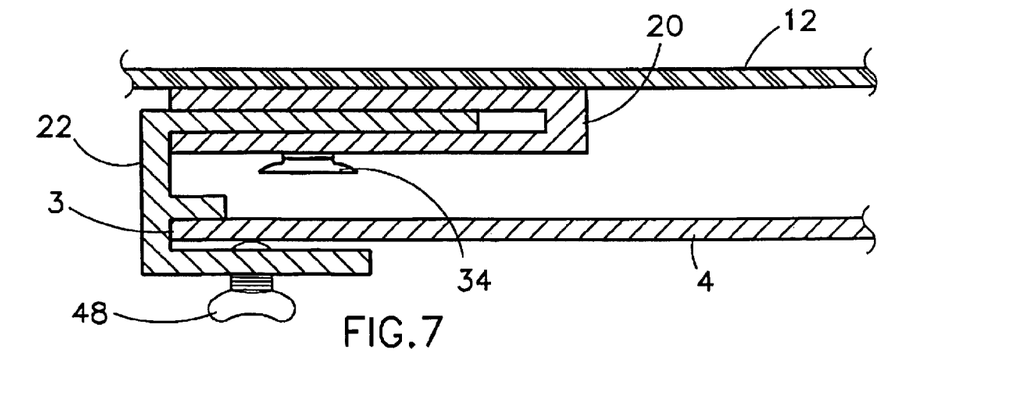
FIG. 7 is an enlarged partial cross-sectional view of a retaining locking system in accordance with the present invention, showing the retaining locking system securing the hood shield device to a hood of a vehicle.

The following description of the retaining block 20, the mating clip attaching means 22 and the wing bolt 48 describe the retaining locking system for all four retaining locking systems. Since they are preferably identical in construction, only one will be described in detail. Referring to FIGS. 8 and 9, the retaining block 20 comprises a top side 24, a bottom side 26 and an interior longitudinal slot 28 which extends for most of the length of the retaining block 20 and is located between the top and bottom sides 24 and 26. The interior slot 28 has a transverse opening 30 extending out of a sidewall 32 of the retaining block 20. Referring to FIG. 7, there is provided a temporary hood attaching retaining means 34 which is affixed to the bottom side 26 of the retaining block 20. By way of example, the temporary hood attaching retaining means 34 may be a suction cup or comparable retaining member. The suction cup 34 is used for positioning the hood shield device 12 onto the hood 4 so that the retaining block 20 and the hood shield device 12 will not scratch the paint off the vehicle 2. When the hood shield device 12 is positioned on the hood 4, the mating clip attaching means 22 is used to secure the hood shield device 12 onto the hood 4 of the vehicle, thereby lifting the suction cup 34 away from the hood 4 as shown in FIG. 7.

The mating clip attaching means 22 comprises an elongated upper section 36, a middle section 38, a lower section 40 and a vertical section 42 which connects the upper, middle and lower sections together. The upper section 36 is the longest of the upper, middle and lower sections, while the middle section 38 is the shortest of the upper, middle and lower sections. The upper section 36 is sized to fit into the interior longitudinal slot 28 of the retaining block 20. The middle section 38 and the lower section 40 form a channel 44 therebetween. The lower section 40 has a threaded opening 46 which extends therethrough for accommodating the soft tip threaded wing bolt 48 (see FIG. 10) which secures the impact hood shield device 12 to the hood 4 of the vehicle 2 from underneath the hood of the vehicle. The channel 44 is sized to accommodate the edge 3 of the hood 4 of the vehicle 2. The vertical section 42 is sized to permit the upper section 36 to be inserted into the longitudinal slot 28 of the retaining block 20 while the channel 44 simultaneously fits around the edge 3 of the hood 4.

Figure 11:
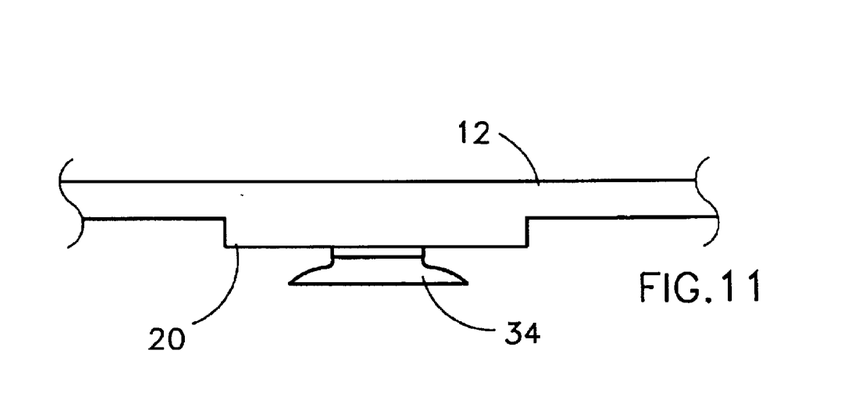
FIG. 11 is a partial cross-sectional view of an alternative embodiment of a retaining locking system in accordance with the present invention, showing the retaining locking system securing the hood shield device to a hood of a vehicle.

With the mating clip attaching means 22 and the retaining block 20 held on the hood 4 in this manner as illustrated in FIG. 7, the hood shield device 12 cannot be removed from the vehicle because the mating clip attaching means 22 is firmly held between the edge 3 of the hood 4 through insertion of the channel 44 onto hood edge 3 with the vertical section 42 firmly wedged within the groove between the edge 3 and fender 8. The upper section 36 is firmly held in the slot 28 of the retaining block 20 while the retaining block 20 is firmly affixed on the lower surface of shield 12 by epoxy or other suitable means. It will be appreciated that the present invention is not limited to epoxy which secures the retaining block 20 to the shield 12. It is emphasized that while the epoxy is preferred, it is also within the spirit and scope of the present invention to utilize other types of securing means not shown. Referring to FIG. 11, by way of example the retaining block 20 can be integrally formed on the lower side of the hood shield device 12 as shown with the suction cup 34 affixed thereto.

Referring to FIGS. 1, 7, 8, 9, and 10, the above described retaining locking system comprising the retaining block 20, the mating clip attaching member 22, the threaded wing bolt 48, and the suction cup 34 are positioned at location 100 as illustrated. In the preferred embodiment, identical retaining systems are located at locations 110, 120 and 130. The only difference is that the clip attaching member 22 is reversed 180° at locations 120 and 130 from the view illustrated so that the clip attaching member extends into the interior slot in the retaining block at those locations. Of course, the vertical section 42 is wedged into the groove between hood edge 3 and fender 8 at locations 120 and 130. In the preferred embodiment as illustrated in FIG. 1, locations 100 and 120 are at the front corners of the hood 4 and locations 110 and 130 are at the intersection of the rear of the hood shield device 12 and rearmost corners of the portion of the hood 4 protected by the hood shield device 12. The hood shield device 12 is spaced apart from the vehicle's hood 4 by the retaining locking systems which keep the unit raised above the vehicle hood, to allow for non-direct contact and to allow air and moisture to escape therefrom.

The retaining locking system as described above serves to retain the hood shield device 12 in a manner by which it cannot be stolen. With the hood 4 in the closed position, it is impossible to remove the hood shield device 12. The four retaining locking systems located at locations 100, 110, 120 and 130 firmly hold the hood shield device 12 on the hood 4 through each retaining block 20 which is firmly held on the hood in a non-removable fashion by its clip attaching means 22 firmly placed in interior slot 28 and secured onto the edge of the hood. Furthermore, the entire hood can be raised to access the engine compartment without the necessity of removing the hood shield device 12 from the hood 4.

To install or reinstall the external impact protective apparatus 10 on the vehicle 2, four retaining blocks 20 are placed on the hood 4 at the locations 100, 110, 120 and 130, with the respective suction cups 34 retaining the retaining blocks 20 on the hood 4. The hood shield device 12 is placed over the hood 4 with respective suction cups temporarily attached to the hood. Thereafter, with the hood in the open position, each respective mating clip attaching means 22 is slid into its respective retaining block with each respective retaining block and channel 44 pressed onto the corresponding edge of the hood 4. The soft tip wing bolt 48 is threadedly engaged with the clip attaching means 22 and secured against the hood 4. The suction cups 34 are then lifted off the hood 4 and the hood 4 is then lowered to the closed position.

Figures 5, 6:
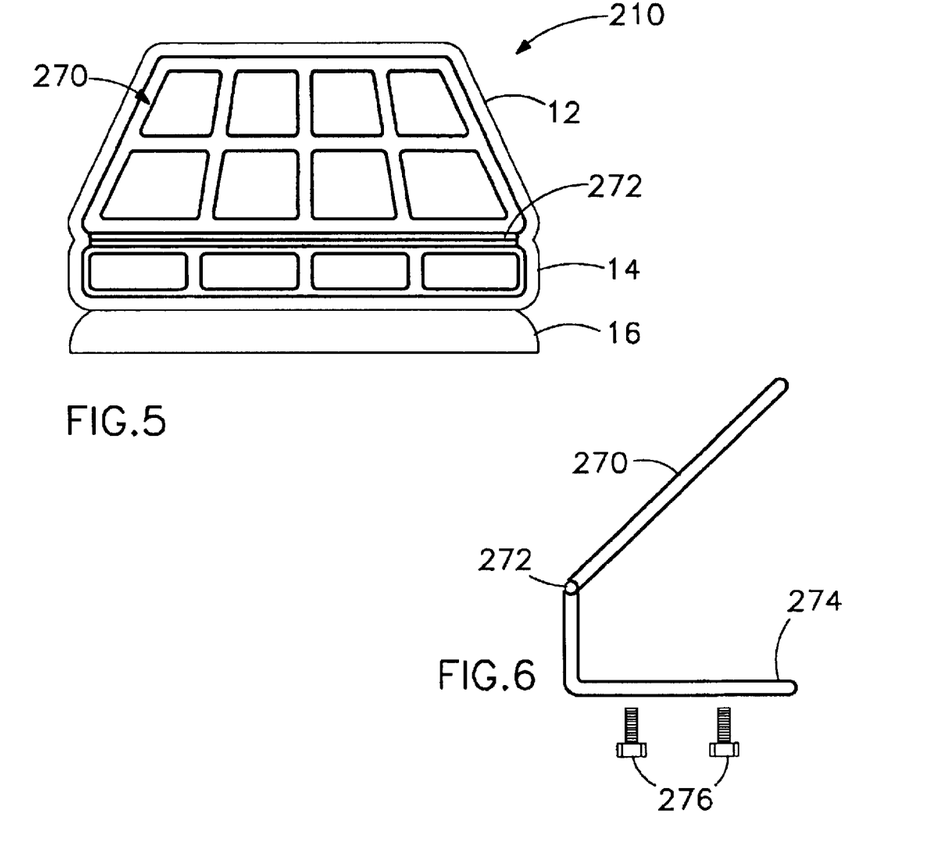
FIG. 5 is a perspective view of an alternative embodiment of the present invention external impact protective apparatus.
FIG. 6 is a cross-sectional view taken along line 6—6 of FIG. 5.
Figure 12:
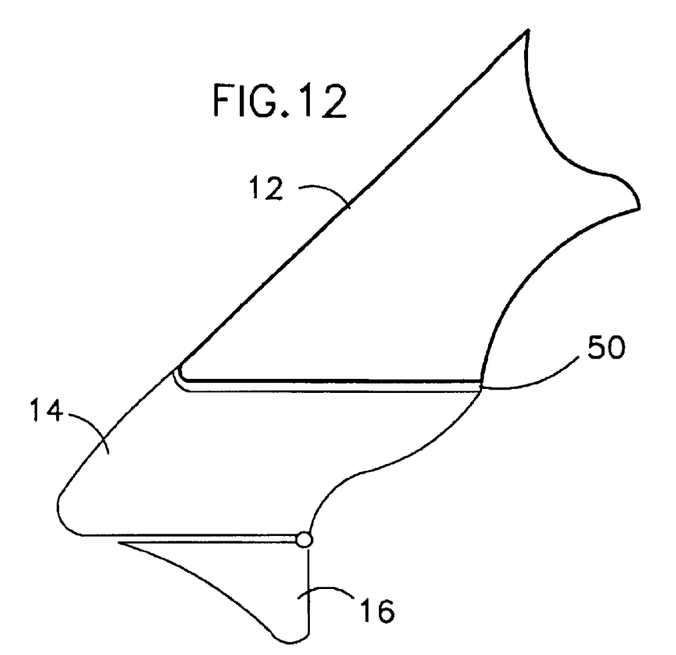
FIG. 12 is a cross-sectional view of the present invention external impact protective apparatus, showing the attachment between the impact hood shield device and the gel-air impact bumper device.

Referring to FIGS. 1, 2, 3, 4, 5 and 12, the impact bumper device 14 is a full length gel-air impact bumper structure which is hingeably connected to an outer edge 60 of the hood shield device 12 in the manner illustrated by hinge 272 in FIG. 5 and also by hinge 50 in FIG. 12 and hangs down therefrom to cover and protect the vehicle's bumper 6 for absorbing impacts when the vehicle is in an impact event. The impact gel-air bumper device 14 is adapted to rest along the bumper of the vehicle. The full length gel-air bumper device 14 may be a plurality of spaced apart gel-pacs hanging down from the hood shield device 12, depending on the type of vehicle on which the external impact protective apparatus 10 is installed. The hood shield device 12 for any given vehicle 2 has appropriately designed openings such as 62 and 64 so that vehicle headlights 5 will not be obstructed. The hood shield device 12 also comprises openings 66 so as not to interfere with other lights such as turn signal lights 7 and parking or high beam lights and further so as not to interfere with the air intake and other accessories on the grill 9 of the vehicle 2. The impact bumper device 14 is designed to absorb light collisions to initially absorb an impact event with a cushioning protection of an additional 5 mph/hr in excess of the protection afforded by conventional bumpers, or bring existing bumpers to absorb a total of 10 mph/hr impact. This primary absorbing event would halt what would be a jarring impact which could cause damage or injury.

The flexible impact spoiler device 16 is a full length retractable impact spoiler structure for reducing drag on the vehicle. The spoiler device 16 is hingeably connected to the bumper device 14 so that it can swivel away from the vehicle without breaking off when the spoiler device 14 strikes an object and springs back to its initial position ready for another impact (see FIG. 4). The retractable impact spoiler structure is hollow and is made out of hard rubber material so that it can absorb impact more effectively than prior art spoilers. The spoiler device 16 can survive impacts better than fiberglass or metal spoilers because of its rubber content and further, on impact, the spoiler device is capable of retracting from the impact because of the spring hinged system which allows it to snap into place after the impact or contact has occurred.

Figure 15:
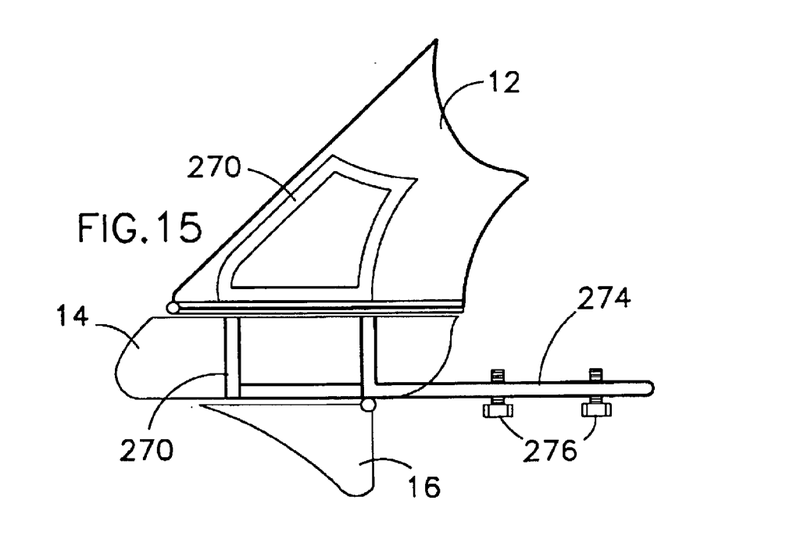
FIG. 15 is a cross-sectional view of the present invention external impact protective apparatus shown in FIG. 5 and FIG. 6.

Referring to FIGS. 5, 6 and 15, there is shown at 210 an alternative embodiment of the present invention external impact protective apparatus. In this embodiment of the present invention, a plurality of spaced apart longitudinal and transverse flat bars which form a metal grill cage 270 is integrally molded to the hood shield device 12, the bumper device 14 and the spoiler device 16. The hood shield device 12 and the bumper device 14 are attached by means of a heavy duty hinge 272 at the point where the hood meets the grill area when open or closed and the hinge 272 allows the hood area of the external impact protective apparatus to swing up and away from the hood of the vehicle while remaining attached to the metal cage 270. The metal cage 270 is in turn attached to the vehicle under a carriage 274 by bolt means 276. It may be unhooked from the metal cage 270 to allow it to be hinged forward by pulling locking pins located on both sides of the heavy-duty hinge 272.

Referring to FIG. 12, there is shown a soft rubber hinge 50 which attaches the hood shield device 12 to the gel-air impact bumper device 14 so that the bumper device can flex for allowing the hood shield device 12 to be lifted forward.

Figure 13:
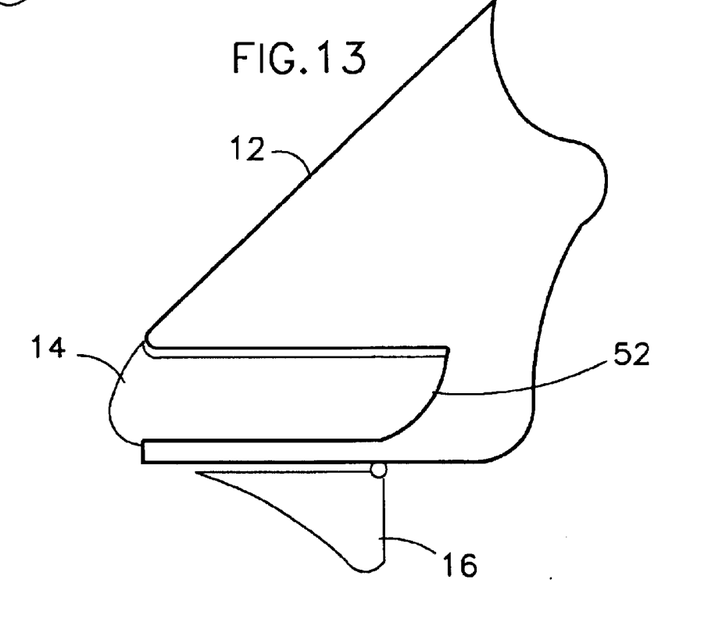
FIG. 13 is a cross-sectional view of another alternative embodiment of the present invention external impact protective apparatus.

Referring to FIG. 13, there is shown another alternative embodiment of the present invention external impact protective apparatus, where the gel-air impact bumper device 14 is inserted into a plastic frame 52 of the impact hood shield device 12 so that the entire apparatus can be lifted up with the hood of the vehicle.

Figures 14, 16:
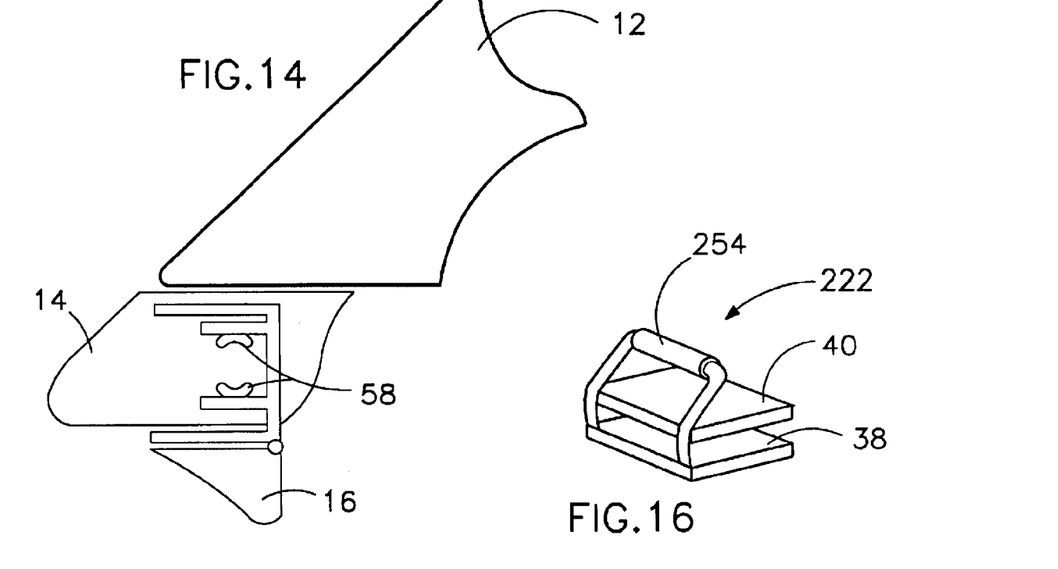
FIG. 14 is a cross-sectional view of still another alternative embodiment of the present invention external impact protective apparatus.
FIG. 16 is an enlarged perspective view of alternative embodiment of the mating clip attaching means of the retaining locking system in accordance with the present invention shown in FIG. 9.

Referring to FIG. 14, there is shown still another alternative of the present invention external impact protective apparatus, where the gel-air impact bumper device 14 and the retractable impact spoiler device 16 are separate from the impact hood shield device 12 and the impact hood shield device 12 can be lifted up with the hood, as the impact bumper device 14 remains attached to the existing bumper of the vehicle The impact spoiler device 16 is attached to the existing bumper with a bracket 56 and wing bolts 58 as shown. The bracket 56 and wing bolts 58 are part of the metal frame that holds the gel-air bumper device 14 and the impact spoiler device 16 to the existing bumper from the back inside of the bumper of the vehicle.

Referring to FIG. 16, there is shown an enlarged perspective view of an alternative embodiment of the mating clip attaching means 222 of the retaining locking system. A movable handle 254 is movably attached on the lower section 40 of the clip attaching means 222, whereby when the handle 254 is pushed or pulled, it moves the lower and middle sections 40 and 38 toward each other, thereby applying pressure to the hood to secure the clip attaching means 222 thereto.

The present invention conforms to conventional forms of manufacture or any other conventional way known to one skilled in the art. The manufacturing process which could accommodate the construction of the external impact protective apparatus may be injection, thermoform, etc. or other molding process. By way of example, the impact hood shield device 12 can be made of plastic material or any other suitable material. By way of example, the gel-air impact bumper device 14 can be made from a soft exterior material such as rubber or plastic and filled with gel-filled material, air-filled material, rubber-filled material, foam-filled material, water-filled material, sponge-filled material, solid rubber ball filled material, hollow rubber ball filled material, foam pellet filled material, and foam ball filled material. By way of example, the flexible impact spoiler device 16 can be made of rubber material or any other suitable material.

It will be appreciated that the present invention external impact protective apparatus can be manufactured with the impact hood shield device 12, the gel-air impact bumper device 14 and the flexible impact spoiler device 16 integrally connected to each other or manufactured with the impact hood shield device, the impact bumper device and the impact spoiler device independently from each other.

Defined in detail, the present invention is a vehicle impact protective apparatus used in conjunction with a vehicle having at least a hood, a front bumper, and two front fenders on either side of the hood, the hood being defined by two side edges adjacent a respective front fender and a hood channel between an edge of the hood and its adjacent fender, the apparatus comprising: (a) a one-piece hood shield which is sized to cover the entire hood of the vehicle and conforms to the shape of the front portion of the vehicle and the front fenders of the vehicle when laid over the hood and the front fenders; (b) four retaining blocks, with a respective one retaining block spaced on the hood adjacent one of the side edges of the hood; (c) the each retaining block having a top surface, a bottom surface and an interior transverse slotted opening extending for most of the length of the each retaining block and located adjacent the side edge of the vehicle hood proximate the location of the each retaining block, the top surface of the each retaining block affixed to the vehicle hood; (d),at least one suction cup member affixed on the lower surface of the each retaining block which serves to temporary retain the each retaining block on the vehicle hood; (e) a mating clip attaching member for the each retaining block and having an upper elongated section sized to fit into the interior transverse slotted opening of the each retaining block and secured thereto, a lower section having a grooved end piece defining a channel which is dimensioned to accommodate a portion of a side edge of the vehicle hood, and a vertical section joining the upper elongated section and the lower section and sized to permit the upper elongated section to fit into the interior slotted opening of a retaining block while simultaneously permitting the channel in the grooved end piece of the lower section to receive a portion of a side edge of the vehicle hood, a portion of the vertical section resting within a hood channel; (e means for moving the channel of the lower section of the mating clip attaching member towards each other such that the channel squeezes and secures the portion of the side edge of the vehicle hood thereto; (g) an impact gel-air bumper which is sized to cover the front bumper of the vehicle and being adapted to rest along the front bumper of the vehicle, the gel-pac bumper detachably attached to the hood shield and extends downwardly therefrom for absorbing impacts when the vehicle strikes an object, the gel-pac bumper having a plurality of openings and covering a portion of the vehicle's grill to allow for airflow to the engine and not to obstruct the headlamps or signal systems; and (h) a full length hollow flexible spring loaded spoiler hingeably connected to a bottom of the gel-air bumper such that the flexible spoiler swivels downwardly away from the vehicle without breaking when the spoiler strikes an object and automatically springs back to its original position ready for another impact.

Defined broadly, the present invention is an impact protective apparatus used in conjunction with a vehicle having at least a hood, a front bumper, and two front fenders on either side of the hood, the hood being defined by two side edges adjacent a respective front fender and a hood channel between an edge of the vehicle hood and its adjacent fender, the apparatus comprising: (a) a hood shield which is sized to cover the entire hood of the vehicle and conforms to the shape of the front portion of the vehicle and the front fenders of the vehicle when laid over the vehicle hood and the front fenders; (b) at least four retaining blocks, with a respective one retaining block spaced on the vehicle hood adjacent one of the side edges of the vehicle hood; (c) the each retaining block having an interior slotted opening extending for most of the length of the each retaining block and located adjacent the side edge of the vehicle hood proximate the location of the each retaining block and attached to the vehicle hood; (d) a clip attaching member for the each retaining block and having an upper section sized to fit into the interior slotted opening and secured thereto, a lower section having a grooved end piece defining a channel which is dimensioned to accommodate a portion of a side edge of the vehicle hood, and a vertical section joining the upper section and the lower section and sized to permit the upper section to fit into the interior slotted opening of a retaining block while simultaneously permitting the channel in the grooved end piece of the lower section to receive a portion of a side edge of the vehicle hood, a portion of the vertical section resting within a hood channel; (e) means for closing the channel of the lower section of the mating clip attaching member such that the channel squeezes and secures the portion of the side edge of the vehicle hood thereto; (f) an impact bumper which is sized to cover the front bumper of the vehicle and being adapted to rest along the front bumper of the vehicle, the bumper detachably attached to the hood shield and extends downwardly therefrom for absorbing impacts when the vehicle strikes an object, the bumper having a plurality of openings and covering a portion of the vehicle's grill to allow for airflow to the engine and not to obstruct the headlamps or signal systems; and (g) a flexible spring loaded spoiler hingeably connected to a bottom of the bumper such that the flexible spoiler swivels downwardly away from the vehicle without breaking when the spoiler strikes an object and automatically springs back to its original position ready for another impact.

Defined more broadly, the present invention is a protective apparatus used in conjunction with a vehicle having at least a hood, a front bumper, and two front fenders on either side of the hood, the hood being defined by two side edges adjacent a respective front fender and a hood channel between an edge of the vehicle hood and its adjacent fender, the apparatus comprising: (a) a hood shield which is sized to cover the entire hood of the vehicle and conforms to the shape of the front portion of the vehicle and the front fenders of the vehicle when laid over the vehicle hood and the front fenders; (b) means for securing the hood shield to the hood of the vehicle; (c) an impact bumper being adapted to rest along the front bumper of the vehicle and detachably attached to the hood shield and extends downwardly therefrom for absorbing impacts when the vehicle strikes an object; and (d) a spring loaded spoiler attached to a bottom of the bumper such that the spoiler swivels downwardly away from the vehicle without breaking when the spoiler strikes an object and automatically springs back to its original position ready for another impact.

Also defined in detail, the present invention is an impact bumper used in conjunction with a vehicle having at least a front bumper and a hood, comprising a full length gel-air impact structure filled with a resilient material and which is sized to cover the front bumper of the vehicle and being adapted to rest along the front bumper of the vehicle, the gel-air structure being detachably attached to the hood and extends downwardly therefrom for absorbing impacts when the vehicle strikes an object, the gel-air structure having a plurality of openings and covering a portion of the vehicle's grill to allow for airflow to the engine and not to obstruct the headlamps or signal systems.

Also defined broadly, the present invention is an impact bumper used in conjunction with a vehicle having at least a bumper, comprising an impact structure which is sized to cover the bumper of the vehicle and being adapted to rest along the bumper of the vehicle and extending downwardly therefrom for absorbing impacts when the vehicle strikes an object, the impact structure having at least one opening and covering a portion of the vehicle's grill to allow for airflow to the engine and not to obstruct the headlamps or signal systems.

Also defined broadly, the present invention is a spoiler for a vehicle, comprising a full length hollow flexible spring loaded spoiler hingeably connected to a bottom of the vehicle such that the flexible spoiler swivels downwardly away from the vehicle without breaking when the spoiler strikes an object and automatically springs back after impact to its original position ready for another impact.

Also further defined broadly, the present invention is a spoiler for a vehicle, comprising a flexible spring loaded spoiler hingeably connected to a bottom of the vehicle such that the flexible spoiler swivels downwardly away from the vehicle without breaking when the spoiler strikes an object and automatically springs back to its original position ready for another impact.

Of course the present invention is not intended to be restricted to any particular form or arrangement, or any specific embodiment, or any specific use, disclosed herein, since the same may be modified in various particulars or relations without departing from the spirit or scope of the claimed invention here and above shown and described of which the apparatus or method shown intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A vehicle impact protective apparatus used in conjunction with a vehicle having at least a hood, a front bumper, and two front fenders on either side of the hood, the hood being defined by two side edges adjacent a respective front fender and a hood channel between an edge of the hood and its adjacent fender, the apparatus comprising:

a. a one-piece hood shield which is sized to cover the entire hood of said vehicle and conforms to the shape of the front portion of the vehicle and the front fenders of the vehicle when laid over said hood and said front fenders;

b. four retaining blocks, with a respective one retaining block spaced on said hood adjacent one of the side edges of said hood;

c. said each retaining block having a top surface, a bottom surface and an interior transverse slotted opening extending for most of the length of said each retaining block and located adjacent the side edge of the vehicle hood proximate the location of said each retaining block, the top surface of said each retaining block affixed to said one piece hood shield;

d. at least one suction cup member affixed on said bottom surface of said each retaining block which serves to temporary retain said each retaining block on said vehicle hood;

e. a mating clip attaching member for said each retaining block and having an upper elongated section sized to fit into said interior transverse slotted opening of said each retaining block and secured thereto, a middle section and a lower section forming a channel between the middle section and the lower section which is dimensioned to accommodate a portion of a side edge of the vehicle hood, and a vertical section joining the upper elongated section and the middle section and the lower section and sized to permit the upper elongated section to fit into the interior slotted opening of a retaining block while simultaneously permitting the channel between the middle section and the lower section to receive a portion of a side edge of the vehicle hood, a portion of the vertical section resting within a hood channel;

f. means for moving said middle section and said lower section of said mating clip attaching member towards each other such that said channel squeezes and secures said portion of said side edge of said vehicle hood thereto;

g. an impact gel-air bumper which is sized to cover the front bumper of the vehicle and being adapted to rest along the front bumper of the vehicle, the gel-pac bumper detachably attached to said hood shield and extends downwardly therefrom for absorbing impacts when said vehicle strikes an object; and h. a full length hollow flexible spring loaded spoiler hingeably connected to a bottom of said gel-air bumper such that the flexible spoiler swivels downwardly away from the vehicle without breaking when the spoiler strikes an object and automatically springs back to its original position ready for another impact.

2. The apparatus in accordance with claim 1, wherein said one-piece hood shield is made of clear plastic material.

3. The apparatus in accordance with claim 1, wherein said impact gel-air bumper is filled with gel-filled material.

4. An impact protective apparatus used in conjunction with a vehicle having at least a hood, a front bumper, and two front fenders on either side of the hood, the hood being defined by two side edges adjacent a respective front fender and a hood channel between an edge of the vehicle hood and its adjacent fender, the apparatus comprising:

a. a hood shield which is sized to cover the entire hood of said vehicle and conforms to the shape of the front portion of the vehicle and the front fenders of said vehicle when laid over said vehicle hood and said front fenders;

b. at least four retaining blocks, with a respective one retaining block spaced on said vehicle hood adjacent one of said side edges of said vehicle hood;

c. said each retaining block having an interior'slotted opening extending for most of the length of said each retaining block and located adjacent the side edge of said vehicle hood proximate the location of said each retaining block and attached to said hood shield;

d. a clip attaching member for said each retaining block and having an upper section sized to fit into said interior slotted opening and secured thereto, a middle section and a lower section forming a channel between the middle section and the lower section which is dimensioned to accommodate a portion of a side edge of the vehicle hood, and a vertical section joining the upper section, the middle section and the lower section and sized to permit the upper section to fit into the interior slotted opening of a retaining block while simultaneously permitting the channel between the middle section and the lower section to receive a portion of a side edge of the vehicle hood, a portion of the vertical section resting within a hood channel;

e. means for closing said channel between said middle section and said lower section of said clip attaching member such that said channel squeezes and secures said portion of said side edge of said vehicle hood thereto;

f. an impact bumper which is sized to cover the front bumper of the vehicle and being adapted to rest along the front bumper of the vehicle, the bumper detachably attached to said hood shield and extends downwardly therefrom for absorbing impacts when said vehicle strikes an object; and    g. a flexible spring loaded spoiler hingeably connected to a bottom of said impact bumper such that the flexible spoiler swivels downwardly away from the vehicle without breaking when the spoiler strikes an object and automatically springs back to its original position ready for another impact.

5. The apparatus in accordance with claim 4, wherein said hood shield is made of semitransparent high impact plastic.

6. The apparatus in accordance with claim 4, wherein said impact bumper is filled with gel-filled material.

7. The apparatus in accordance with claim 4, wherein said spring loaded spoiler is made of rubber material.

8. The apparatus in accordance with claim 4, further comprising suction means affixed on said each retaining block which serves to temporary retain said each retaining block on said vehicle hood.

9. A protective apparatus used in conjunction with a vehicle having at least a hood, a front bumper, and two front fenders on either side of the hood, the hood being defined by two side edges adjacent a respective front fender and a hood channel between an edge of the vehicle hood and its adjacent fender, the apparatus comprising:

a. a hood shield which is sized to cover the entire hood of said vehicle and conforms to the shape of the front portion of the vehicle and the front fenders of said vehicle when laid over said vehicle hood and said front fenders;

b. means for securing said hood shield to said hood of said vehicle;

c. an impact bumper being adapted to rest along the front bumper of the vehicle and detachably attached to said hood shield and extends downwardly therefrom for absorbing impacts when said vehicle strikes an object; and    d. a spring loaded spoiler attached to a bottom of said impact bumper such that the spoiler swivels downwardly away from the vehicle without breaking when the spoiler strikes an object and automatically springs back to its original position ready for another impact.

10. The apparatus in accordance with claim 9, wherein said hood shield is made of clear plastic material.

11. The apparatus in accordance with claim 9, wherein said impact bumper is filled with gel-filled material.

12. The apparatus in accordance with claim 9, wherein said spring loaded spoiler is made of rubber material.

13. The apparatus in accordance with claim 9, wherein said means for securing said hood shield to said hood of said vehicle further comprises:

a. a plurality retaining blocks, with a respective one retaining block spaced on said vehicle hood adjacent one of said side edges of said vehicle hood;

b. said each retaining block having an interior slotted opening extending and located adjacent the side edge of said vehicle hood proximate the location of said each retaining block and affixed to said hood shield;

c. suction means affixed on said each retaining block which serves to temporary retain said each retaining block on said vehicle hood;

d. a clip attaching member for said each retaining block and having an upper section sized to fit into said interior slotted opening and secured thereto, a middle section and a lower section forming a channel between the middle section and the lower section which is dimensioned to accommodate a portion of a side edge of the vehicle hood, and a vertical section joining the upper section and the middle section and the lower section and sized to permit the upper section to fit into the interior slotted opening of a retaining block while simultaneously permitting the channel between the middle section and the lower section to receive a portion of a side edge of the vehicle hood, a portion of the vertical section resting within a hood channel; and e. means for closing said channel of between said middle section and said lower section of said clip attaching member such that said channel squeezes and secures said portion of said side edge of said vehicle hood thereto.

14. An impact bumper used in conjunction with a vehicle having at least a front bumper and a hood, comprising a full length gel-air impact structure filled with a resilient material and which is sized to cover the front bumper of the vehicle and being adapted to rest along the front bumper of the vehicle, the gel-air structure being detachably attached to the hood and extends downwardly therefrom for absorbing impacts when the vehicle strikes an object.

15. The impact bumper in accordance with claim 14, wherein said resilient material is a gel-filled material.

* * * * *